United States Patent
Schwab

(10) Patent No.: US 11,712,885 B2
(45) Date of Patent: Aug. 1, 2023

(54) METHOD OF OPERATING A FLEXOGRAPHIC PRINTING PRESS, FLEXOGRAPHIC PRINTING PRESS, SYSTEM, FLEXOGRAPHIC PRINTING FORME AND A SLEEVE FOR A FLEXOGRAPHIC PRINTING FORME

(71) Applicant: Heidelberger Druckmaschinen AG, Heidelberg (DE)

(72) Inventor: Werner Schwab, Bechtsrieth (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/507,892

(22) Filed: Oct. 22, 2021

(65) Prior Publication Data

US 2022/0126565 A1   Apr. 28, 2022

(30) Foreign Application Priority Data

Oct. 22, 2020 (DE) .......................... 102020213325.5

(51) Int. Cl.
*B41F 21/00* (2006.01)
*B41F 5/24* (2006.01)

(52) U.S. Cl.
CPC ................ *B41F 21/00* (2013.01); *B41F 5/24* (2013.01)

(58) Field of Classification Search
CPC ................................... B41F 5/24; B41F 21/00
See application file for complete search history.

(56) References Cited

U.S. PATENT DOCUMENTS

| 4,553,478 A | 11/1985 | Greiner et al. |
| 5,855,739 A | 1/1999 | Ampulski et al. |
| 6,679,169 B2 | 1/2004 | Anweiler et al. |
| 8,534,194 B2 | 9/2013 | Whitelaw et al. |
| 10,011,106 B2 | 7/2018 | Gydesen |
| 10,632,737 B2 | 4/2020 | Billing et al. |

(Continued)

FOREIGN PATENT DOCUMENTS

| DE | 3302798 A1 | 8/1984 |
| DE | 10245702 A1 | 5/2003 |

(Continued)

*Primary Examiner* — David H Banh
(74) *Attorney, Agent, or Firm* — Laurence A. Greeberg; Werner H. Stemer; Ralph E. Locher

(57) ABSTRACT

A method operates a flexographic printing press. The press contains a printing cylinder carrying a sleeve with at least one flexographic printing forme or a flexographic printing cylinder and an impression cylinder forming a printing nip with the printing cylinder to print on a web of printing substrate. The method includes automatically adjusting the transport speed of the web of printing substrate as a function of a dot density of the flexographic printing forme, i.e. of a location-dependent density of printing elevations on the flexographic printing forme, or of data computationally derived therefrom, or as a function of gaps of the flexographic printing forme or printing cylinder or data computationally derived therefrom. The printing press advantageously provides a cost-efficient way of producing high-quality prints in an industrial flexographic printing process while avoiding undesired vibration. In addition, the method of the invention advantageously provides further automation of the printing process.

24 Claims, 9 Drawing Sheets

(56) References Cited

U.S. PATENT DOCUMENTS

| | | | |
|---|---|---|---|
| 2003/0175619 A1* | 9/2003 | Iihara | B41N 1/083 |
| | | | 430/278.1 |
| 2006/0236543 A1* | 10/2006 | Felgenhauer | B41F 13/22 |
| | | | 29/895.2 |
| 2008/0063455 A1* | 3/2008 | Hayashi | B41J 11/009 |
| | | | 400/319 |
| 2010/0011978 A1 | 1/2010 | Whitelaw et al. | |
| 2010/0018419 A1 | 1/2010 | Whitelaw et al. | |
| 2011/0271860 A1* | 11/2011 | Barthelme | B41F 27/1206 |
| | | | 101/477 |
| 2012/0222576 A1* | 9/2012 | McNeil | B41F 31/22 |
| | | | 101/483 |
| 2015/0003883 A1* | 1/2015 | Honda | G03G 15/6529 |
| | | | 399/406 |
| 2017/0165956 A1 | 6/2017 | Becker | |
| 2019/0184712 A1* | 6/2019 | Honda | B41J 2/2056 |
| 2019/0340740 A1* | 11/2019 | Li | G01J 3/465 |
| 2020/0353742 A1 | 11/2020 | Schwab | |
| 2021/0178747 A1 | 6/2021 | Putzer et al. | |

FOREIGN PATENT DOCUMENTS

| | | |
|---|---|---|
| DE | 102005012915 A1 | 9/2006 |
| DE | 102006060464 A1 | 7/2008 |
| DE | 202007004717 U1 | 8/2008 |
| DE | 102014215648 A1 | 2/2016 |
| DE | 102018202282 A1 | 8/2019 |
| DE | 102020111341 A1 | 11/2020 |
| EP | 1842673 A2 | 10/2007 |
| EP | 2147786 A2 | 1/2010 |
| EP | 3251850 A1 | 12/2017 |
| EP | 2956304 B1 | 7/2019 |
| EP | 3838595 A1 | 6/2021 |
| WO | 2008049510 A1 | 5/2008 |
| WO | 2010146040 A1 | 12/2010 |

* cited by examiner

METHOD OF OPERATING A FLEXOGRAPHIC PRINTING PRESS, FLEXOGRAPHIC PRINTING PRESS, SYSTEM, FLEXOGRAPHIC PRINTING FORME AND A SLEEVE FOR A FLEXOGRAPHIC PRINTING FORME

CROSS-REFERENCE TO RELATED APPLICATION

This application claims the priority, under 35 U.S.C. § 119, of German Patent Application DE 10 2020 213 325.5, filed Oct. 22, 2020; the prior application is herewith incorporated by reference in its entirety.

FIELD AND BACKGROUND OF THE INVENTION

The invention relates to a method that has the features described in the preamble of the independent method claim.

The invention further relates to a flexographic printing press which is operated in accordance with a method of the invention to print on a printing substrate using flexographic printing ink and which has the features described in the preamble of the independent flexographic printing press claim.

The invention further relates to a system consisting of a flexographic printing press of the invention and a measuring device for measuring the dot density of the flexographic printing forme, the system having the features described in the preamble of the independent system claim.

The invention further relates to a flexographic printing forme or a sleeve for use in a method of the invention or for use in a flexographic printing press of the invention or for use in a system of the invention, the printing forme having the features described in the preamble of the independent flexographic printing forme or a sleeve claim.

The technical field of the invention is the field of the graphic industry, in particular the field of operating a flexographic printing press, i.e. a rotary printing press which uses flexographic printing formes to print. In particular, the invention is in the subcategory of controlling the press or rather the drives and/or actuating drives thereof to avoid or reduce disturbances.

A requirement in what is known as flexographic printing, in particular industrial, web-fed flexographic printing, is to print in a cost-efficient way at high speeds with as little waste as possible while maintaining a high quality and using different flexographic printing formes for every print job.

Printing cylinders, in particular those with preferably small circumferences (in view of the number/cost of flexographic printing plates), tend to exhibit undesired vibration.

In this context, changing print jobs with different printing formes and different prints may cause problems: the images to be printed may include areas where a lot is printed and areas where only little is printed as well as areas where nothing or hardly anything is printed (gaps). Such gaps may extend in a circumferential direction or in an axial direction in a printing forme, the latter being worse in most cases. In a printing operation involving multiple printing formes, such gaps may also be located between printing formes that are spaced apart from one another. A specific production speeds, such gaps (or rather the bounces they cause as they pass the printing nip) may result in vibrations of cylinders, printing units, or the machine.

In accordance with the prior art, what are referred to as support strips have been inserted into the gaps; in printing operations with multiple printing formes, the printing formes were arranged in such a way that no gaps or only the smallest possible gaps which are uncritical in terms of undesired vibration were created (a process referred to as "stagging").

Before the printing operation, flexographic printing plates may be measured, for instance in a measuring station. The post-published, non-prosecuted German patent application DE 10 2020 111 341 A1 (corresponding to U.S. patent publication No. 2020/0353742) discloses a device for measuring elevations on the surface of a rotary body and provides an improvement which in particular provides a way of quickly measuring elevations of rotary bodies such as flexographic print dots on a flexographic printing plate with a great degree of accuracy. The disclosed device for measuring elevations on the surface of a rotary body embodied as a cylinder, roller, sleeve, or plate of a printing press, e.g. a flexographic printing plate mounted to a sleeve, has a first motor for rotating the rotary body about an axis of rotation and a measuring device and is characterized in that the measuring device contains a radiation source and at least one area scan camera for taking contact-free measurements.

The further documents published, non-prosecuted German patent application DE 3302798 A1 (corresponding to U.S. Pat. No. 4,553,478), published, non-prosecuted German patent application DE 1 0201 421 5648 A1, published European patent EP 3251850, published, non-prosecuted German patent application DE 102006060464 A1 (corresponding to U.S. Pat. No. 8,534,194), international patent disclosure WO 2010146040 A1, and international patent disclosure WO 2008049510 A1, which are cited and described in the aforementioned document, and the "SMARTGPS®" system manufactured by the Bobst Company and described therein are also part of the prior art, as is the "ARun" system of the Allstein Company.

When rotary printing presses that process webs of material are operated, disturbances such as what is known in flexographic printing as "bouncing" may affect the quality of the prints. This phenomenon is created by printing cylinder vibration, for instance. The vibrations may in turn be caused by the print image or the arrangement of printing and non-printing areas on the flexographic printing formes.

A known yet unsatisfactory measure to avoid bouncing is to modify the print image by additional—yet in fact undesired—printing or non-printing areas. A further known measure, which is likewise unsatisfactory because it results in too much waste, is to change the printing speed since bouncing only occurs at specific printing speeds due to resonances. Such modifications are usually made by the operator of the machine.

Published, non-prosecuted German patent application DE 102005012915 A1 discloses: In a method of operating a machine with at least one rotating component with a desired target rotary speed, the desired target rotary speed is initially checked to determine whether it is a target speed that is critical in terms of vibration resonances and potentially identified as such a speed. If the result is positive, the machine is specifically not stationarily operated at this critical target speed but at a rotary speed that is either stationary and different from this critical rotary speed by a rotary speed value or oscillates about this critical target speed. A sensor for detecting vibrations, for instance a sensor arranged on a cylinder journal of the machine, may be used in this process.

The post-published, European patent application EP 3838595 A1 (corresponding to U.S. patent publication No. 2021/0178747) discloses a method of operating a rotary printing press wherein disturbances of a rotating printing cylinder are detected and reduced by changing the printing speed. The disturbances are detected at an actuating drive of the printing cylinder.

European patent EP 2956304 B1 (corresponding to U.S. Pat. No. 10,011,106) likewise discloses an approach to reducing cylinder bouncing: chamfered edges.

In general, sleeves are not equipped with flexographic printing plates (mounting) until shortly before printing starts.

In flexographic printing, the press stage and the prepress stage are much less closely linked than in offset printing, for instance: JDF or XJDF have not been established as an interface between prepress and press. This means that the print shop usually does not have any prepress data. In many cases, the prepress stage, in particular the platesetting process to create the flexographic printing formes, even takes place at a different shop.

SUMMARY OF THE INVENTION

An object of the present invention is to provide an improvement over the prior art, in particular an improvement that provides a cost-efficient way of producing high-quality prints in an industrial flexographic printing operation while avoiding undesired vibration.

Solution in Accordance with the Invention

In accordance with the invention, this object is attained by a method as recited in the independent method claim, a flexographic printing press as recited in the independent flexographic printing press claim, a system as recited in the independent system claim, and by a flexographic printing forme or a sleeve for a flexographic printing forme as recited in the independent flexographic printing forme or a sleeve claim.

Advantageous and thus preferred further developments of the invention will become apparent from the dependent claims as well as from the description and drawings.

A method of the invention relates to operating a flexographic printing press. The flexographic printing press contains a printing cylinder carrying a sleeve with at least one flexographic printing forme or a flexographic printing cylinder and an impression cylinder forming a printing nip with the printing cylinder. A web of printing substrate is printed on in the printing nip and a transport speed of the web is set. The invention is characterized in that the setting is done automatically as a function of a dot density of the flexographic printing forme, i.e. of a location-dependent density of printing elevations of the flexographic printing forme (in particular a density which has the value zero or essentially zero, i.e. areas without elevations or gaps)—or data computationally derived therefrom—or as a function of gaps of the flexographic printing forme or of the printing cylinder—or data computationally derived therefrom.

A flexographic printing press with at least one flexographic printing unit containing a printing cylinder carrying a sleeve with at least one flexographic printing forme or containing a flexographic printing cylinder, an impression cylinder forming a printing nip with the printing cylinder, and an anilox roller—wherein the flexographic printing press is operated to print on a printing substrate using flexographic printing ink in accordance with the method described above, is characterized in that the flexographic printing press contains at least one drive motor for rotatively driving the printing cylinder and/or the impression cylinder and/or an anilox roller and/or for rotatively driving of a motor for conveying the web.

A system of the invention consisting of a flexographic printing press according to the invention and a measuring device for measuring the dot density of the flexographic printing forme is characterized in that the measuring device measures the dot density of the flexographic printing forme or gaps of the flexographic printing forme or of the printing cylinder, in particular determining areas of a dot density which has the value zero or essentially zero (i.e. areas without elevations or channels), and transmits the dot density or data derived therefrom or the gaps or data computationally derived therefrom to the flexographic printing press.

A flexographic printing forme or a sleeve for a flexographic printing forme for use in a method or in a flexographic printing press or in a system, the flexographic printing forme or sleeve being marked width a machine-readable ID, is characterized in that the machine-readable ID is read out by a machine and saved on a computer to be accessed.

Advantageous Embodiments and Effects of the Invention

The invention advantageously provides a cost-efficient way of producing high-quality prints while avoiding undesired vibration in an industrial flexographic printing process. In addition, the method of the invention advantageously provides further automation of the printing process.

The print images may include areas where a lot is printed and areas where only little is printed; as well as areas where nothing or hardly anything is printed (the latter areas being referred to as gaps in the following). Such gaps may extend in the circumferential direction in a printing forme or in an axial direction, which in most cases is worse. In a printing operation involving multiple printing formes, such gaps may also be located between printing formes that are spaced apart from one another. Gaps in particular do not have any printing elevations, i.e. the value of the dot density at these locations is zero.

The term "gap" is herein understood to refer to a non-printing or essentially non-printing area in a print image on a flexographic printing forme or a non-printing or essentially non-printing area between two flexographic printing formes on a common sleeve. The area extends in an axial direction (in terms of an axis of rotation of the flexographic printing cylinder) and in a circumferential direction perpendicular to the axial direction (i.e. in terms of the circumferential direction of a flexographic printing cylinder). In the axial direction, the area may but does not have to extend over the entire length of a flexographic printing forme. In the axial direction, the area has a length L>200 mm or L>300 mm or preferably L>400 mm. In the circumferential direction, the area has a width B>3 mm or preferably B>5 mm. In the axial direction, the area is not followed by a printing area of a length I>10 mm or I>20 mm or preferably I>30 mm.

The term "bounce pattern" is herein understood to refer to the geometric pattern of at least two gaps of a flexographic printing forme or of at least two flexographic printing forms. In particular the x/y positions of the gaps and their length L and width B.

The invention is described in the context of flexographic printing presses and flexographic printing formes (relief printing). Alternatively, the invention may be used for engraved printing formes or engraved sleeves (gravure). Thus in the context of the present invention, "gravure" or "flexographic or gravure" may be used as alternatives to "flexographic". Instead of "sleeve with a flexographic printing forme", the expression "sleeve with an engraved printing forme" or "engraved sleeve" or "laser-engraved sleeve" or "endless laser-engraved sleeve" or "endless printing forme" or "endless printing sleeve" may be used.

Further Developments of the Invention

The following paragraphs describe preferred further developments of the invention (in short: further developments).

A respective further development of the method of the invention may be characterized in that a) the dot density of the flexographic printing forme or the gaps is/are measured.

b) the dot density of the flexographic printing forme or the gaps is/are measured in a contact-free way.

c) the dot density of the flexographic printing forme is measured by means other than follower rolls.

d) the dot density of the flexographic printing forme is measured before the printing operation.

e) the dot density of the flexographic printing forme is measured in a measuring device before the printing operation.

f) the measuring device contains a receptor cylinder for receiving the flexographic printing forme or a sleeve carrying the flexographic printing forme, g) the receptor cylinder rotates about an axis of rotation—which has an axial direction—during the measurement.

h) the measuring device is operated outside the flexographic printing press.

i) the measuring is done using a topographer.

j) a camera is used in the measuring process.

k) an area scan camera (2D image camera) is used in the measuring process.

l) a line scan camera (1D image camera) is used in the measuring process.

m) at least one CIS sensor is used in the camera.

n) a stationary camera is used in the measuring process.

o) the camera is moved in a direction perpendicular to the axial direction before the measuring operation.

p) the camera is moved in an axial direction during the measuring operation.

q) a radiation source, in particular a light source, is used in the measuring operation carried out by the camera.

r) an entire image of a flexographic printing forme or of the printing cylinder is recorded in the measuring operation.

s) at least one or at least two flexographic printing forme(s) is/are mounted to a sleeve and recorded in the measuring operation.

t) in the measuring operation, the entire sleeve, i.e. the circumferential surface thereof equipped with flexographic printing formes, is recorded.

u) in the measuring operation, light from a light source gets to elevations of the flexographic printing forme and from there to the camera.

v) in the measuring operation by means of the camera, at least one mirror is used.

w) the mirror is disposed to be movable.

x) that before the measuring operation, the mirror is moved in a direction perpendicular to the axial direction.

y) during the measuring operation, the mirror is moved in an axial direction.

z) in the measuring operation, light from a light source gets to elevations of the flexographic printing unit and from there back to the camera via the mirror.

aa) in the measuring operation, a laser and a triangulation measurement operation are used.

bb) the dot density is computationally determined from prepress data for creating the flexographic printing forme.

cc) a calculation of adjustment values is made.

dd) the adjustment values are transmitted to a control unit of a motor for rotatively driving the printing cylinder and/or the impression cylinder and/or an anilox roller and/or to a control unit of a motor for conveying the web.

ee) the calculation is made as a function of a dot density of the flexographic printing forme, i.e. of a location-dependent density of printing elevations of the flexographic printing forme, or of data computer computationally derived therefrom, or as a function of gaps the flexographic printing forme or of the printing cylinder or of data derived therefrom.

ff) in the calculation of the adjustment values, various rotary speeds of the printing cylinder are used.

gg) the calculation of the adjustment values includes calculating various surface speeds of the flexographic printing forme at various rotary speeds.

hh) in the calculation of the surface speeds, various axial thicknesses of flexographic printing formes and/or of sleeves are used.

ii) the calculation of the adjustment values includes calculating various cylinder bounce frequencies at various surface speeds.

jj) the calculation of the adjustment values includes calculating at least one cylinder bounce frequency or a bounce pattern of multiple gaps of a flexographic printing forme or of multiple flexographic printing formes at various surface speeds.

kk) the calculation of the adjustment values includes the use of or the exclusion of measured and/or predefined resonance frequencies of the printing cylinder and/or of the impression cylinder and/or of components of the flexographic printing press and/or of printing units of the flexographic printing press and/or of the flexographic printing unit.

ll) the pre-defined resonance frequencies are digitally saved and accessed.

mm) the pre-defined resonance frequencies are determined in advance by sensors.

nn) the determination by sensors is done by means of at least one sensor at an actuating drive for a contact pressure/printing pressure between the flexographic printing cylinder and the impression cylinder.

oo) rotary speeds which are critical in terms of resonances are determined.

pp) rotary speeds which generate undesired resonance vibration detrimental to print quality due to cylinder bouncing or a cylinder bounce pattern caused by a gap or multiple gaps are avoided when the flexographic printing press is in operation using one or more previously measured flexographic printing forme/flexographic printing formes or are skipped when the rotary speed is changed (by selecting a higher rotary speed than the critical rotary speed or a lower rotary speed than the critical rotary speed).

qq) rotary speeds which generate undesired resonance vibration detrimental to print quality due to cylinder bouncing or due to a cylinder bounce pattern caused by a gap or multiple gaps are avoided when a flexographic printing press is in operation using multiple printing units, each one with one previously measured flexographic printing forme or more previously measured flexographic printing formes or are skipped when the rotary speed is changed (by selecting a higher rotary speed than the critical rotary speed or a lower rotary speed than the critical rotary speed).

rr) when the rotary speeds are avoided, a difference of at least 3 m/min or at least 4 m/min is maintained between the rotary speeds and a resonance rotary speed.

ss) a computer, i.e. a digital computer, is used to make the calculation.

tt) the dot density or the data derived therefrom is transmitted to the computer.

uu) the flexographic printing forme comprises an anilox roller for inking the flexographic printing forme.

vv) a calculated target value of the adjustment value is compared to a determined actual value during an undisturbed printing operation and a deviation of the target value from the actual value is computationally determined on the basis of the comparison and a correction value is computationally determined.

ww) when printing with different flexographic printing formes of a number of flexographic printing formes, different correction values are determined and saved.

xx) an AI goes through computational learning steps with the saved correction values and, before a printing operation with a further flexographic printing forme which is different from the number of flexographic printing formes—the AI determines a correction value for the flexographic printing forme and this correction value is used in the printing operation.

yy) rotary cylinder speeds critical for resonances and thus to be avoided are determined as target values and rotary cylinder speeds at which actual resonances occur when the press is in operation are determined by measurement—preferably in an automated way—as actual values (for instance using a method as disclosed in the post-published European patent application EP3838595A1) and both values are computationally compared. A plurality of such comparisons and the deviations potentially found between the actual values and the target values may then be used to train a computer or an AI to correct future target values in a corresponding way and make better forecasts. In this way, undesired resonances may be avoided in an even better way. Alternatively, what is known as a look-up table may be used, i.e. a table which preferably contains information on changes of the rotary cylinder speeds that are critical in terms of resonances and thus need to be avoided as a function of changes made to the machine, for instance changing sleeves with different sleeve diameters/circumferences.

A respective further development of the flexographic printing press of the invention may be characterized in that:

a) the drive motor is computationally controlled (potentially in a closed control loop) using the dot density or data derived therefrom or as a function of gaps of the flexographic printing forme or of the printing cylinder or data computationally derived therefrom in such a way that the transport speed of the web has a predefined value or a predefined value range or that the transport speed of the web excludes a predefined value or a predefined range of values.

b) the flexographic printing press is operated to print on paper, cardboard, paperboard, each of which may be coated, foil, or a composite material.

c) the flexographic printing forme has at least one gap.

d) the sleeve carries at least two flexographic printing formes with the same or different images to be printed.

e) the two flexographic printing formes are mounted to the sleeve so as to follow one another in the circumferential direction or so as to follow one another in the axial direction.

f) at least one flexographic printing forme has at least one gap and/or a gap is formed between the flexographic printing formes.

A respective further development of the system of the invention may be characterized in that:

a) The measuring device is part of a measuring station which is separate from the flexographic printing press.

b) the flexographic printing forme and/or the sleeve is marked with a machine-readable ID.

c) the ID is embodied as an unambiguous identifier of the sleeve.

d) the identifier comprises multiple signs, in particular digits and/or letters.

e) the ID is marked as a one-dimensional code, in particular a bar code, or as a two-dimensional code, in particular a QR code, or as a RFID chip or NFC chip.

f) the measuring device transmits the dot density or data derived therefrom or the gaps of the flexographic printing forme or of the printing cylinder or data computationally derived therefrom directly to the flexographic printing press together with the ID.

g) the measuring device indirectly transmits the dot density or data derived therefrom or the gaps of the flexographic printing forme or of the printing cylinder or data computationally derived therefrom to the flexographic printing press together with the ID in that the dot density or the data derived therefrom is buffered and accessed by the flexographic printing press for the printing operation using the flexographic printing forme and/or the sleeve.

h) the derived data comprise at least one gap pattern or a frequency corresponding to a gap pattern.

i) the buffering is done on a central memory or a cloud memory.

A respective further development of the flexographic printing forme of the invention or sleeve of the invention for a flexographic printing forme may be characterized in that:

a) the mark with the machine-readable ID is made using a marking means different from an RFID chip.

Any desired combination of the features and combinations of features disclosed in the above sections on the technical field, invention, and further developments as well as in the section below on exemplary embodiments likewise represents advantageous further developments of the invention.

Other features which are considered as characteristic for the invention are set forth in the appended claims.

Although the invention is illustrated and described herein as embodied in a method of operating a flexographic printing press, a flexographic printing press, a system, a flexographic printing forme and a sleeve for a flexographic printing forme, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, corresponding features have the same reference symbols. Repetitive reference symbols have sometimes been left out for reasons of visibility.

Figure 1:
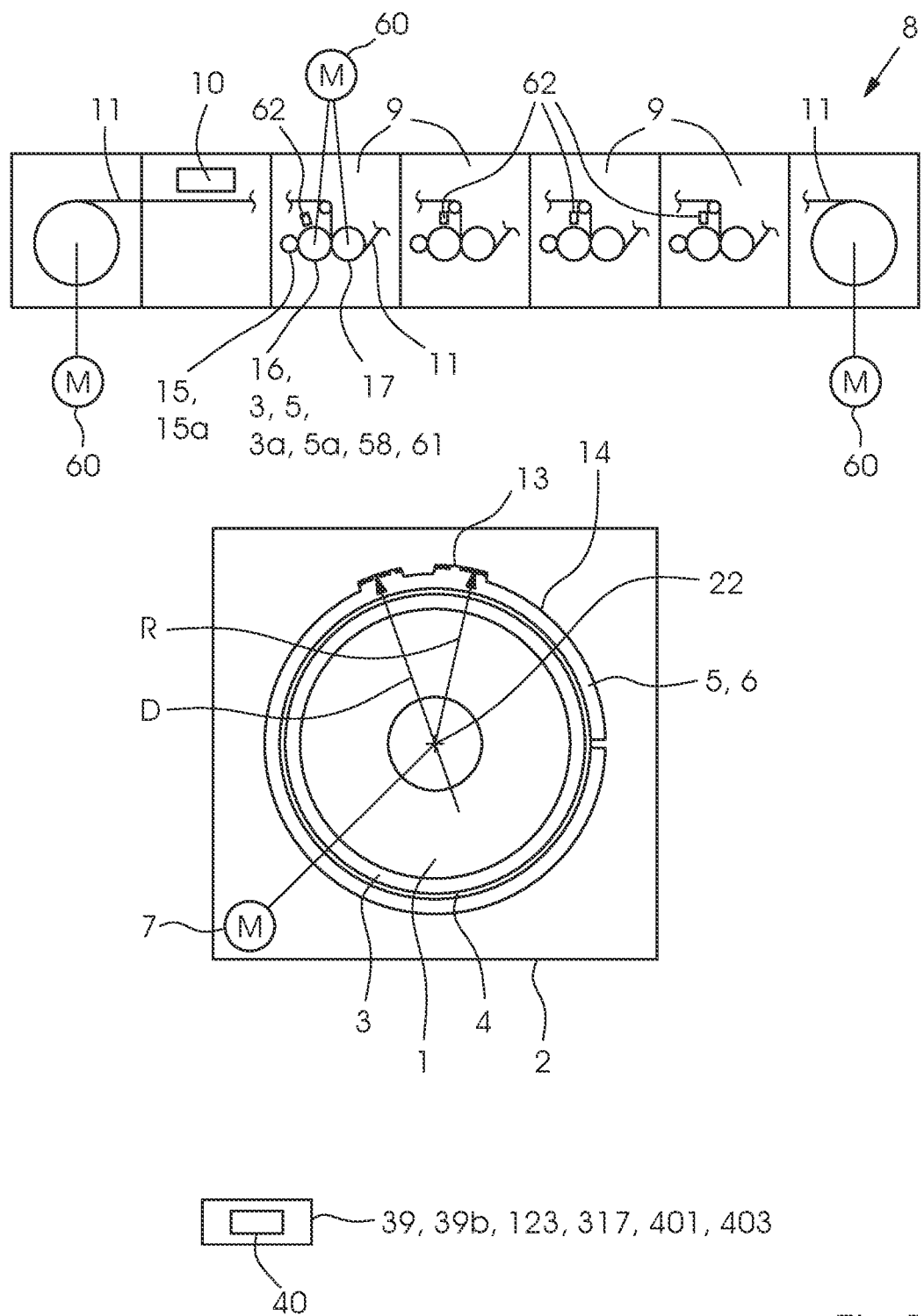
FIGS. 1 to 5 are illustrations showing a flexographic printing press, a measuring station including a measuring device (in different embodiments) and a measuring process according to the invention.

Referring now to the figures of the drawings in detail and first, particularly to FIG. 1 thereof, there is shown a cross section of a rotatable carrier cylinder 1 of a measuring station 2, a sleeve 3 received on the carrier cylinder, and a printing plate 5 (flexographic printing forme) as a rotary body 6. The printing plate 5 is received on the sleeve 3, preferably fixed to the sleeve by use of an adhesive tape 4 (or, alternatively, by means of an adhesive coating on the sleeve)—a process referred to as "mounting", and its topography is to be measured. Alternatively, a self-adhesive sleeve may be used.

A motor 7 may be provided in the measuring station to rotate the carrier cylinder during the measuring operation. The measuring station may be a part of what is known as a "mounter" (in which printing plates are mounted to carrier sleeves) or it may be separate from a "mounter". The measuring station may be separate from a printing press 8 (flexographic printing press) which includes at least one printing unit 9 (flexographic printing unit) for the printing plate 5 and at least one dryer 10 for printing on and drying a printing substrate 11, preferably a web-shaped printing substrate (alternatively: sheet-shaped). The printing plate is preferably a flexographic printing forme with a diameter of between 106 mm and 340 mm. The dryer is preferably a hot-air dryer and/or a UV dryer and/or an electron beam dryer and/or an IR dryer. The sleeve may be pushed onto the carrier cylinder from the side. Openings for emitting compressed air to widen the sleeve and to create an air cushion when the sleeve is slid on may be provided in the circumferential surface of the carrier cylinder. The sleeve with the printing plate may be removed from the measuring device after the measuring operation to be slid onto a printing cylinder of the printing unit in the printing press. A hydraulic mounting system may be used as an alternative to the pneumatic mounting system.

The measuring station 2 may be calibrated with the aid of measuring rings 12 provided on the carrier cylinder 1. Alternatively, a measuring sleeve or the carrier cylinder itself may be used for calibration purposes.

In addition, FIG. 1 illustrates a digital computer and/or a digital memory 39, 39b, 123, 317, 401 and/or 403. The measuring device may produce data and transmit it to the computer/memory. The data may be measured values obtained by measuring the sleeve 3 and/or the flexographic printing forme(s) 5 or data derived therefrom. The computer/memory may be a part of the measuring device 2 or a part of the flexographic printing press 8; it may also be separate, for instance a central computer/memory (for instance in a print shop) or a cloud-based computer/memory. The computer/memory may transmit data to the flexographic printing press, for instance the measured values or the data derived therefrom or data further derived therefrom. The further derived data may be generated by an algorithm implemented on a computer and/or by an AI (artificial intelligence; a software or hardware-based self-learning and machine-learning system). The computer/memory may receive data from multiple measuring stations and transmit data to multiple flexographic printing presses or receive data from multiple flexographic printing presses. The system consisting of the flexographic printing press(es), the measuring station(s), and the computer/memory provides a high degree of automation in the printing process even as far as autonomous printing; error-prone inputs and/or modifications of data made by an operator may advantageously be avoided.

Figure 2A:
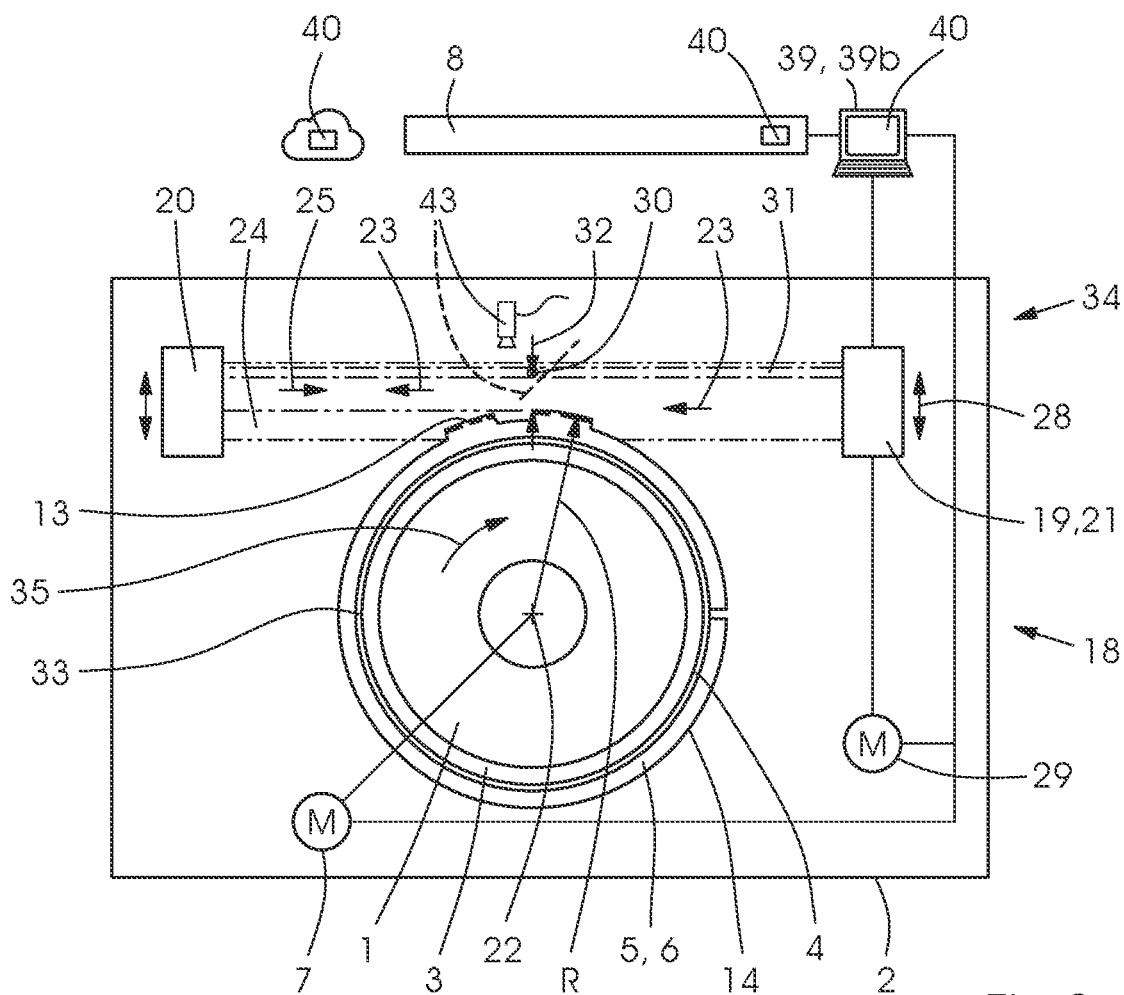
Figure 2C:
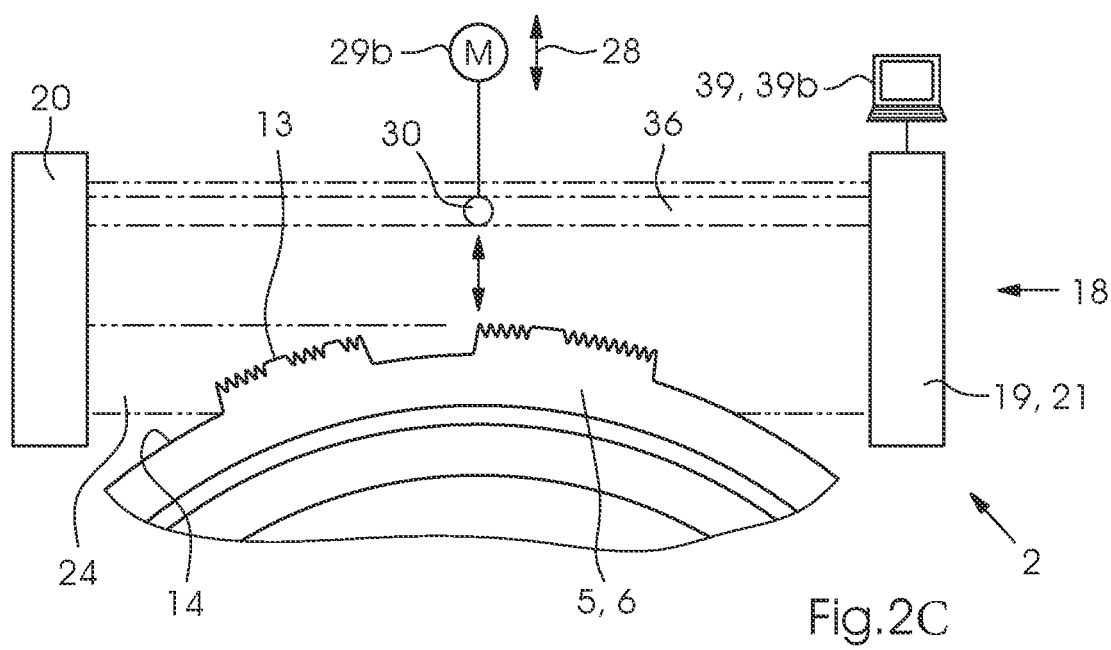

The following figures illustrate preferred embodiments of devices for taking contact-free measurements of elevations 13 on the surface 14 of a rotary body 6 embodied as a flexographic printing forme of the printing press (cf. FIG. 2C). The elevations may be flexographic printing dots (in the halftone) or flexographic printing surfaces (in a solid area) of a flexographic printing plate. The following exemplary embodiments describe the process of taking measurements on a printing plate 5. Due to the measurement of the printing plate, an automated presetting of the respective optimum operating pressure between the cylinders involved in the printing operation, e.g. the anilox cylinder 15, the printing cylinder 16 with the printing plate 5, and the impression cylinder, is made possible.

Figure 2B:
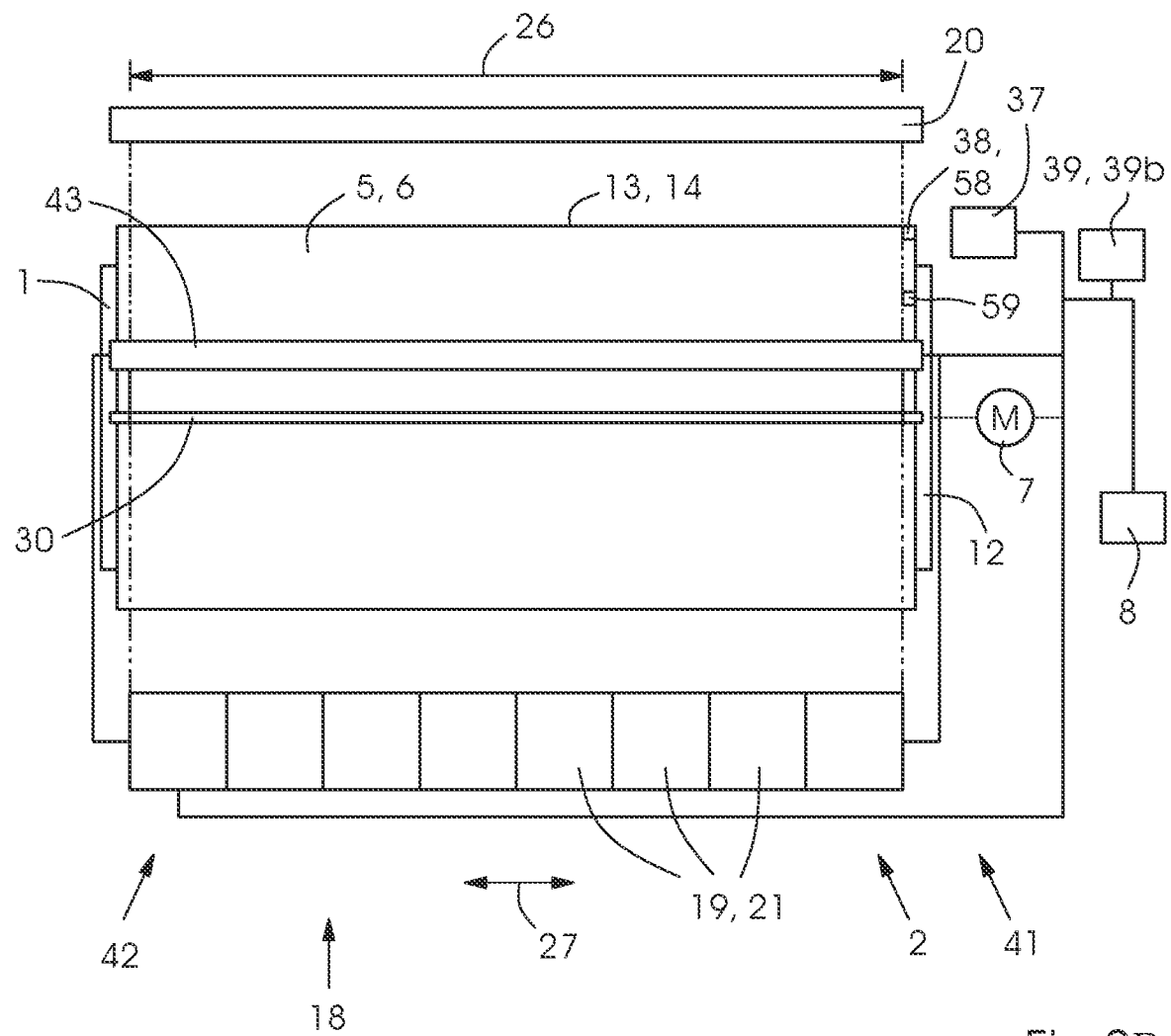

FIGS. 2A to 2C illustrate a preferred embodiment of the device for measuring the topography of a printing plate 5; FIG. 2A is a cross-sectional view, FIG. 2B is a top view, and FIG. 2C is an enlarged section of FIG. 2A. In accordance with this embodiment, the topography is preferably measured by multiple devices 18 in the course of a 3D radius detection with an optional reference line.

In this and the following embodiments, 2D is understood to indicate that a section of the printing plate 5 (for instance an annular height profile) is scanned and 3D is understood to indicate that the entire printing plate 5 (for instance a cylindrical height profile composed of annular height profiles) is scanned.

The device contains multiple radiation sources 19, in particular light sources 19, preferably LED light sources, at least one reflector 20 such as a mirror, and at least one optical receiver 21, preferably an area scan camera and in particular a high-speed camera. The following paragraphs assume that the radiation sources are light sources, i.e. visible light is emitted. Alternatively, the radiation source may emit different electromagnetic radiation such as infrared radiation. The light sources are preferably disposed in a row perpendicular to the axis of rotation 22 of the carrier cylinder 1 and generate a light curtain 23 while the carrier cylinder 1 with the sleeve 3 and the printing plate 5, i.e. the contour, generate a shading 24. The reflected and subsequently received light 25, i.e. essentially the emitted light 23 without the light 24 shaded off by the topography 13, carries information on the topography 13 to be measured. The reflector 20 may be a reflecting foil. The information may be information on printing and non-printing areas and the height thereof on the flexographic printing forme or information on the local dot density of the flexographic printing forme.

The light source 19 is two-dimensional. The light source preferably emits visible light. The light sources 19 and the optical receivers 21 preferably cover the working width 26, i.e. the extension of the printing plate 5 in the direction of its axis 22 (for instance 1650 mm). Preferably, n light sources 19 and receivers 21 may be provided, with 2>n>69, for example. When smaller cameras are used, an upper limit greater than 69 may be necessary. If the entire working width 26 is covered, the printing plate 5 may be measured during one revolution of the carrier cylinder 1. Otherwise, the light sources and optical receivers would have to be moved, for instance in a clocked way, in an axial direction 27 along the printing plate.

The preferred cameras for use in the process are cheap but fast cameras 21 such as black-and-white cameras. The cameras may record individual images or a film during the rotation of the printing plate 5.

The device made up of the light sources 19, reflector 20, and optical receiver 21 may preferably only be moved in a direction 28 perpendicular to the axis 22 of the carrier cylinder 1 to direct the generated strip of light 23 to the topography 13 to be measured. For this purpose, a motor 29 may be provided. Alternatively, the reflector may be stationary and only the light source and/or the optical receiver may be moved, for example by means of a motor.

In contrast to the representation, the measuring operation of the topography 13 is preferably occurs in a perpendicular direction (e.g. camera at the bottom and reflector at the top) and not in a horizontal direction because in this case, any potential bending of the carrier cylinder 1 and reference object 30 may be ignored. For this preferred solution, one needs to imagine FIG. 2A rotated through a 90° angle in a clockwise direction.

A line-like object 30, preferably a tautened thread 30 or a tautened piece of string 30, for instance a metal wire or a carbon fiber or a blade (or a blade-like object or an object with a cutting edge) or a bar, which creates a line 31 of reference for the plurality of optical receivers 21 is provided as an optional reference object 31. The line-like object preferably extends in a direction parallel to the axis of the carrier cylinder 1 and is preferably disposed a short distance 32, for instance 2 mm to 10 mm (20 mm at the maximum) away from the circumferential surface 33 with the printing plate 5 arranged thereon. The received light 25 further includes information that may be analyzed on the reference object 30 such as its location and/or distance from the surface 14 of the printing plate 5 (the surface being preferably etched and therefore on a lower level than the elevations 13). The reference line may be used to determine the radial distance R of the topography 13 (contour) or the contour's elevations from the reference object 30, preferably by means of digital image processing. The distance between the reference object 30 and the axis 22 of the carrier cylinder 1 is known due to the arrangement and/or a motorized adjustment of the reference object 30 (optionally together with the light source 19 and the optical receiver 21 and the reflector 20 if provided). Thus, the radial distance of the contour elevations, i.e. the radius R of the print dots, may be determined by computation. Due to the use of the reference object 30 and the presence of shades created by it of a reference line 31 corresponding to the shade (in the recorded image/from the received light) of every camera 21 a precise, of the cameras relative to one another is not strictly necessary. Moreover, the reference object 30 may be used to calibrate the measuring system.

For the purpose of movement/adjustment in a direction 28 the reference object 30 may be coupled to the light source 19 and/or to the motor 29. Alternatively, the reference object may have its own motor 29b for movement/adjustment purposes.

For an initial referencing of the device, a measurement preferably is taken on an ("empty") carrier cylinder or on a measuring sleeve arranged thereon (measuring the distance between the reference object and the surface from DS to OS). DS and OS are abbreviations for the terms drive side and operator side, respectively, of a machine such as a printing press in which the sleeve is to be used. Both these terms and their abbreviations are common in the graphic industry and a person skilled in the art will therefore be familiar with them.

For a further initialization of the device before the measuring operation, a first step preferably is to move the area scan camera 21 towards the carrier cylinder 1. The movement is preferably stopped as soon as the camera detects preferably the first elevation. Then the reference object 30 is preferably likewise moved in direction 28 until a predefined distance, e.g. 2 mm from the carrier cylinder 1 is reached.

Light source 19 and optical receiver 21 may alternatively be disposed on opposite sides of the carrier cylinder 1; in such a case no reflector 20 is required.

The light source 19, the reflector 20 (if it is present in the embodiment), the optical receiver 21 and the optional reference object 30 form a unit 34, which is movable (in a direction perpendicular to the axis 22 of the carrier cylinder), in particular adjustable or slidable by a motor.

During the measuring operation, the carrier cylinder 1 and the printing plate 5 located thereon rotate to ensure that preferably all elevations 13 may be scanned in the circumferential direction 35. Based thereon, a topographic image and the radius R of individual elevations 13, e.g. flexographic printing dots, from the axis 22 or the diameter D (measured between opposite elevations) may be determined as a function of the angular position of the carrier cylinder 1.

In the enlarged view of FIG. 2C, a section of the topography 13 of the printing plate 5 as well as the shading 24 of the topography and the shading 36 of the reference object 30 are visible. The topographic elevations 13 may be in a range between 2 μm and 20 mm.

In addition, a sensor 37 may be provided to scan the sleeve 3 and/or the printing plate 5 for an identification feature 38 (cf. FIG. 2B). This feature may, for instance, be a bar code, a 2D code such as a QR code or a data matrix code, a RFID tag, or a NFC tag.

The signals and/or data generated by the light receivers 21 and containing information on the topography 13 of the measured surface 14 and on the reference object 30 are transmitted to a computer 39 to be processed, preferably via a wire or a wireless connection. The computer is connected to the printing press 8. The computer 39 analyzes the information.

Before the measurement, the reference object 30 may be moved into the reception range of the optical receiver 21 to calibrate the optical receiver. The optical receiver 21 detects the reference object and transmits the signals generated in the calibration to the computer 39. The calibration data are saved in the digital memory 40 of the computer 39.

This provides a way of saving a virtual reference object on the computer 39.

Subsequently the reference object 30 is removed from the range of the optical receiver 21 and the topography 39 of the surface 14 to be measured is processed together with the virtual reference object.

The result of the analysis is saved in a digital memory 40 of the computer, in a digital memory 40 of the printing press, or in a cloud-based memory. The saved results are preferably saved in association with the respective identification mark 38. When the sleeve-mounted printing plate 5 (or sleeve/flexographic printing forme) is used in the printing press 8 at a later point, the identification feature 38 of the printing plate 5/flexographic printing forme (or sleeve) may be scanned again to access the values associated with the identification mark 38, for instance for presetting purposes.

For instance, the printing press may receive the data required for a print job from the cloud-based memory.

The result of the analysis may preferably include up to four values: The printing pressure adjustments on the two sides 41/DS (drive side) and 42/OS (operator side) between the printing cylinder 16, i.e. the cylinder carrying the measured printing plate 5, and the impression cylinder 17 or printing substrate transport cylinder 17, and the printing pressure adjustments between an anilox roller 15 for inking the measured printing plate 5 and the printing cylinder 16 as they are required during operation.

In addition, a device 43 for determining dot density, for instance by optical scanning, may be provided, preferably a CIS (contact image sensor) scan bar, a line scan camera, or a laser triangulation device. Alternatively, the device 43 may be a mirror which may pivot or be movable in a way for it to be usable together with the light sources 19, 21 to measure dot density. The device is preferably connected to a device for image processing and/or image analysis, which is preferably identical with the computer 39—i.e. the computer 39 programmed in a corresponding way—or which may be a further computer 39b.

A CIS scan bar may be disposed to be axially parallel with the cylinder. It preferably contains LED for illumination and sensors for recording images (similar to a scan bar in a commercial copying machine). The bar is preferably disposed at a distance of 1 to 2 cm from the surface or is positioned at this distance. The cylinder with the surface to be measured, e.g. the printing plate, rotates underneath the bar, which generates an image of the surface in the process to make it available for image analysis to determine dot density. The data obtained from the dot density determination process may additionally be used, for instance, computationally to select or recommend the best anilox roller from among a plurality of available anilox rollers for the printing operation with the recorded printing forme.

Figure 3A:
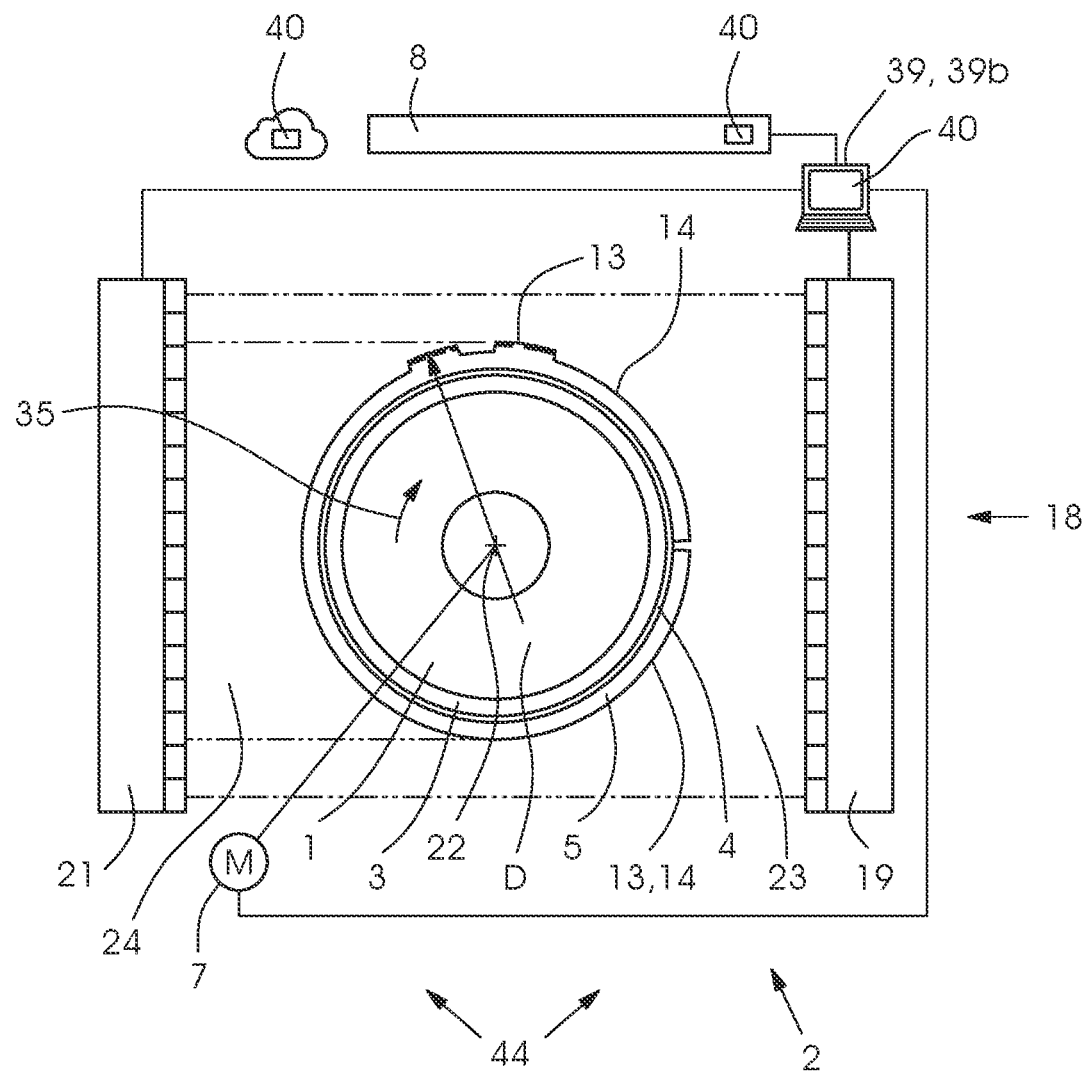
Figure 3B:
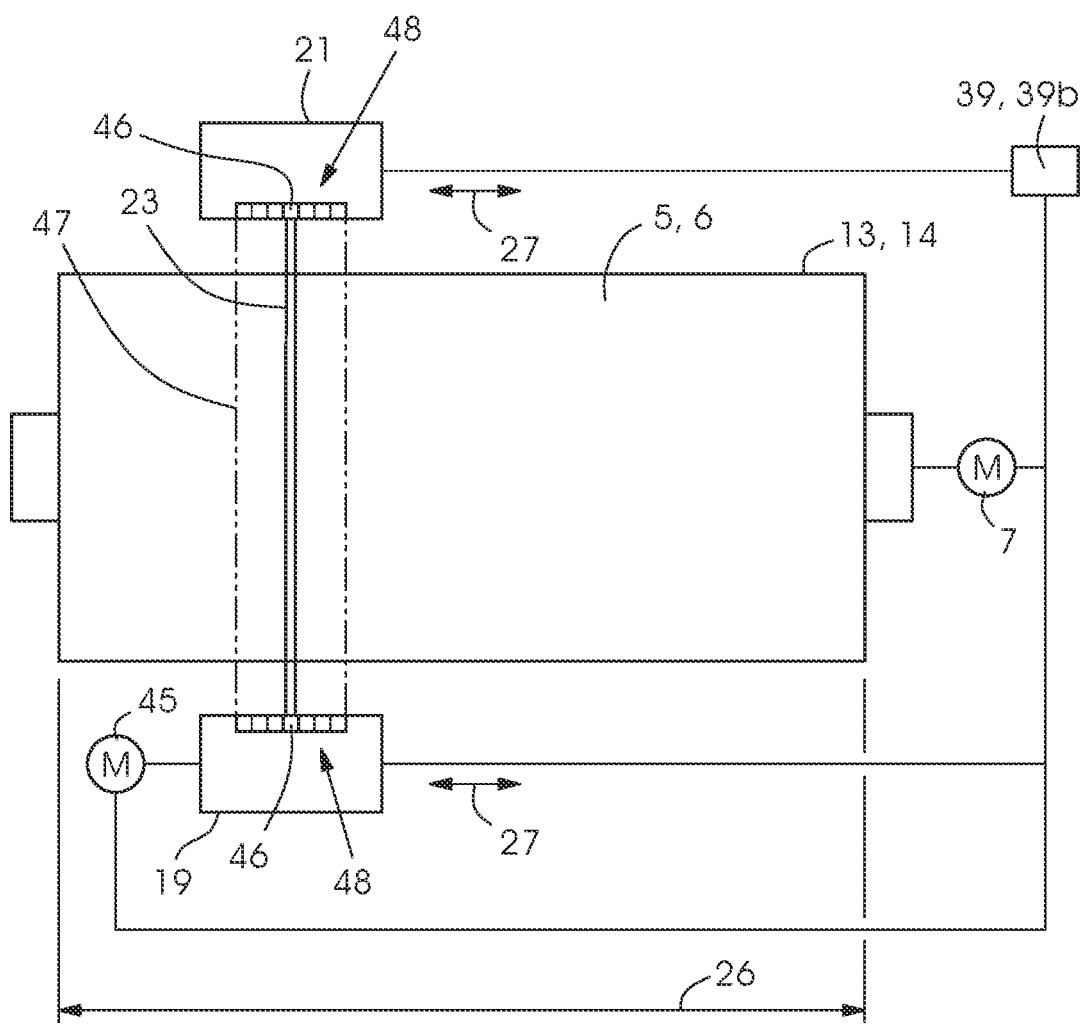

FIGS. 3A and 3B illustrate preferred embodiments of the device for measuring the topography of a printing plate 5; FIG. 3A is a cross-sectional view and FIG. 3B is a top view. In accordance with this embodiment, the topography is preferably scanned by a laser micrometer 44 in the course of a 2D diameter determination process.

The device contains the light source 19, preferably a line-shaped LED light source 19 or a line-shaped laser 19, and an optical receiver 21, preferably a line scan camera 21. Together, the laser and optical receiver form a laser micrometer 44. The light source 19 generates a light curtain 23 and the carrier cylinder 1 with the sleeve 3 and the printing plate 5 creates a shading 24. The line lengths of the light source 19 and the optical receiver 21 are preferably greater than the diameter D of the carrier cylinder including the sleeve and printing plate to allow the topography to be measured without any movement of the device 44 perpendicular to the axis 22 of the carrier cylinder. In other words, the cross section of the carrier cylinder is completely within the light curtain.

The device 44 containing the light source 19 and the optical receiver 21 may be moved in a direction parallel to the axis 22 of the carrier cylinder (in direction 27) to record the entire working width 26. For this purpose, a motor 45 may be provided.

A sensor 37 for identifying the sleeve 3 and/or the printing plate 5 based on an identification feature 38 may be provided (cf. FIG. 2B).

The signals and/or data generated by the optical receivers 21 are transmitted for further processing, preferably by wire or wireless connection, to a computer 39. The computer is connected to the printing press 8.

Light source 19 and optical receiver 21 may alternatively be disposed on the same side of the carrier cylinder 1; if this is the case, a reflector 20 is disposed on the opposite side in a way similar to the one shown FIGS. 2A and 2C.

In accordance with an alternative embodiment, the topography is preferably recorded using a laser micrometer 44 in the course of a 2D diameter determination process, which does not only record an individual measuring row 46, but a wider measuring strip 47 (illustrated in dashed lines) consisting of multiple measuring rows 48 (illustrated in dashed lines). In this exemplary embodiment, the light source 19 and the optical receiver 21 are preferably two-dimensional and not just line-shaped. The light source 19 may comprise multiple light rows 48 of a width of approximately 0.1 mm and at a distance of approximately 5 mm from one another. In this example, the camera is preferably an area scan camera.

Figure 4A:
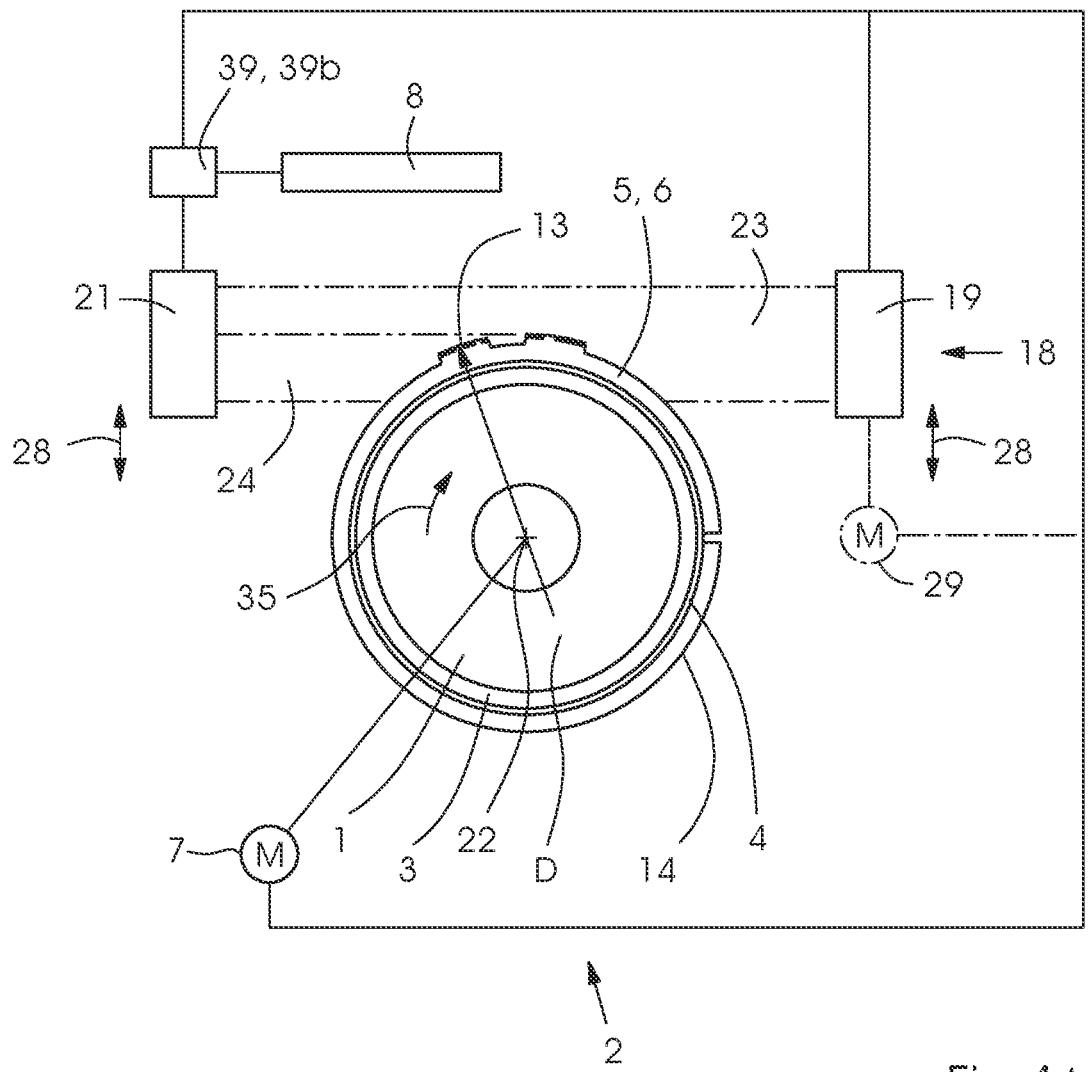
Figure 4B:
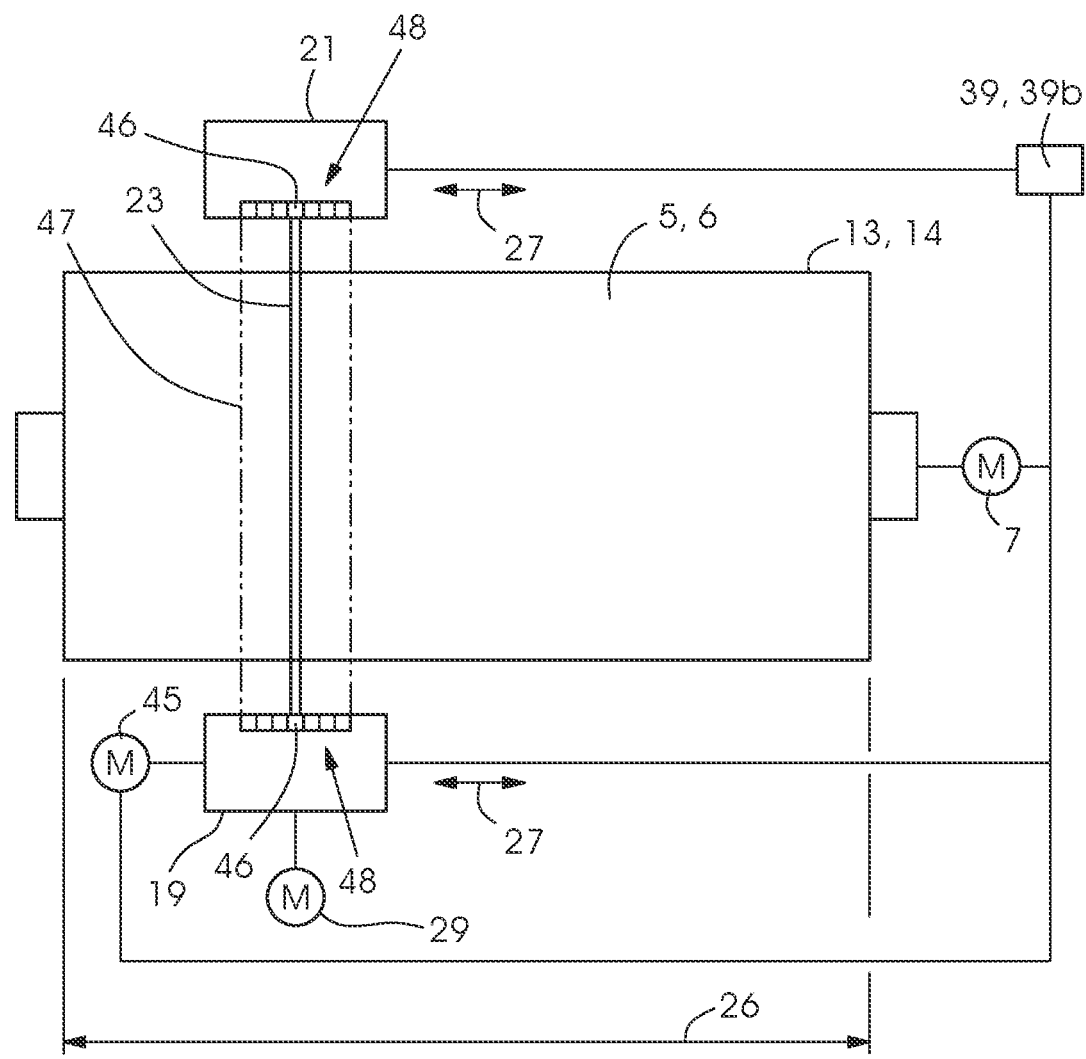

FIGS. 4A and 4B illustrate a preferred embodiment of the device for measuring the topography of a printing plate 5; FIG. 4A is a cross-sectional view and FIG. 4B is a top view. In accordance with this embodiment, the topography is preferably scanned by a laser micrometer in the course of a 2D diameter determination process.

The device contains the light source 19, preferably an LED light source 19, and the light receiver 21, preferably a line-shaped LED light source 21 or a line-shaped laser 21. The light source 19 generates a light curtain 23 and the carrier cylinder 1 with the sleeve 3 and the printing plate 5 creates a shading 24.

The device made up of the light source 19 and optical receiver 21 may preferably be moved in a direction 28 perpendicular to the axis 22 of the carrier cylinder 1 to direct the light curtain 23 to the topography 13 to be measured. For this purpose, a motor 29 may be provided. In a case in which the light curtain 23 is wide enough to cover the entire measuring area, the motor 29 is not necessary.

The signals and/or data generated by the optical receivers 21 are transmitted for further processing, preferably by wire or wireless connection, to a computer 39. The computer is connected to the printing press 8.

The light source 19 and the optical receiver 21 may alternatively be disposed on the same side of the carrier cylinder; if this is the case, a reflector 20 is disposed on the opposite side in a way similar to the one shown FIGS. 2A and 2C.

In accordance with an alternative embodiment, the topography 13 is preferably scanned using a laser micrometer 44 in the course of a 3D diameter determination process, which does not only record one measuring row 46, but a wider measuring strip 47 (illustrated in dashed lines), i.e. multiple measuring rows 48 at the same time. In this embodiment, the light source 19 and the optical receiver 21 are two-dimensional and not just line-shaped.

In accordance with a further alternative embodiment, the topography 13 is preferably scanned using a laser micrometer 44 in the course of a 3D diameter determination process, in which the device containing the light source 19 and the optical receiver 21 may preferably be moved in a direction 28 perpendicular to the axis of the carrier cylinder 1 to direct the light curtain 23 to the topography 13 to be measured. For this purpose, a motor 29 (illustrated in dashed lines) may be provided.

In accordance with an alternative embodiment, the topography 13 is preferably scanned using a laser micrometer 44 in the course of a 3D radius determination process, in which the two latter alternative embodiments are combined.

Figure 5:
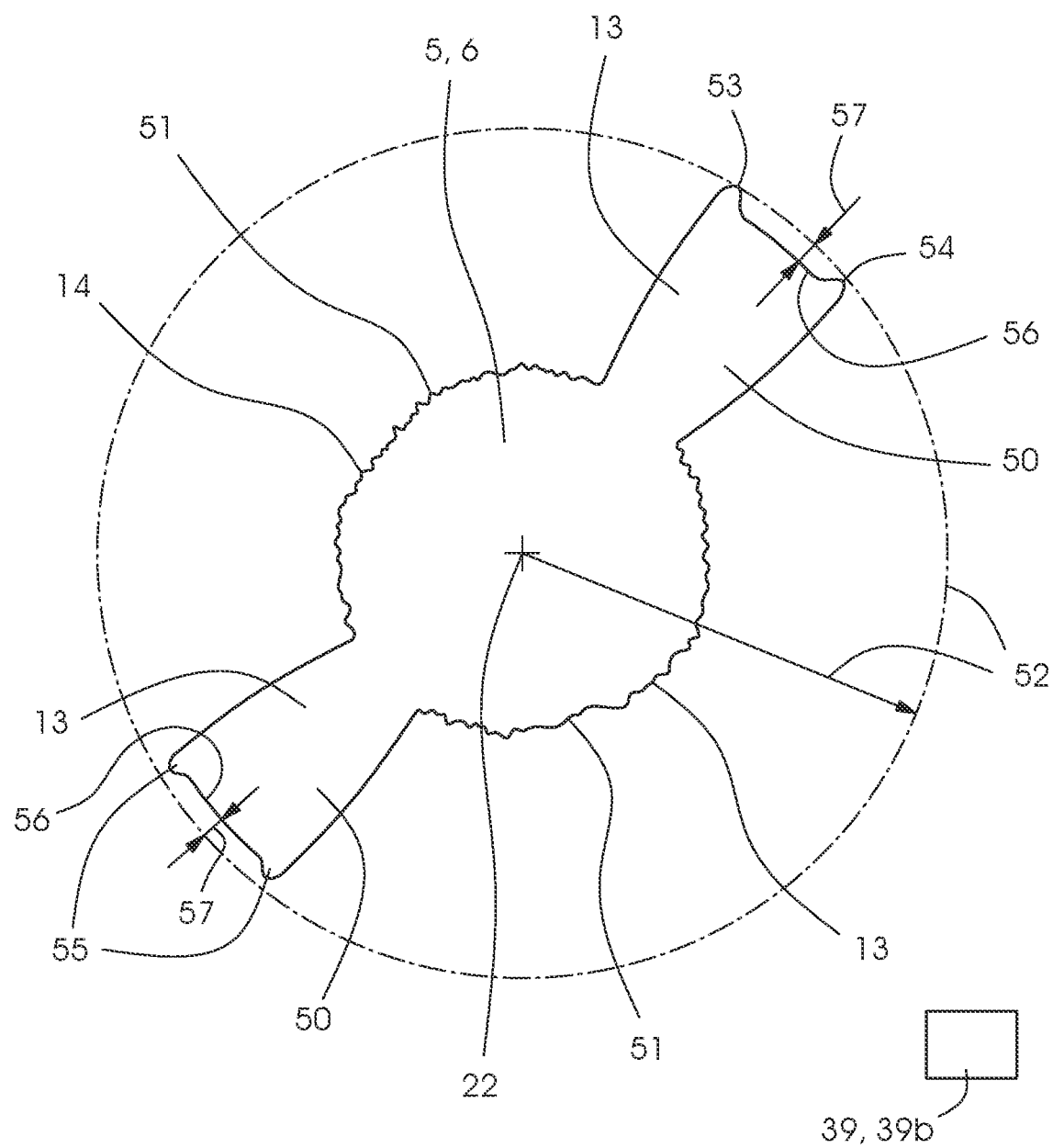

FIG. 5 is a much enlarged representation of an example of a topography measurement result of a printing plate 5 (flexographic printing forme) with two printing areas 50 and two non-printing areas 51. The radial measurement results for 360° at an axial location (relative to the axis of the carrier cylinder) are shown. The non-printing areas may for instance have been created by etching and thus have a smaller radius than the printing areas.

In the drawing, an enveloping radius 52—an envelope 52 of the dots with the greatest radius on the printing plate 5, i.e. of the highest elevations of the topography 13 at the axial location is shown.

Dot 53 on the printing plate 5 is a printing dot because during a printing operation at a normal pressure/print engagement between the printing plate 5 and the printing substrate 11/transport cylinder 17 this dot would have sufficient contact with the printing substrate and the ink-transferring anilox roller. A normal pressure setting creates what is known as a kissprint, which means that the printing plate just barely touches the printing substrate and that the flexographic printing dots are not compressed to any greater extent.

Dot 54 is a dot which would only just print at a regular print engagement setting during a printing operation because it would only just be in contact with the printing substrate.

The two dots 55 are dots which would not print because at regular pressure during a printing operation they would not be in contact with the printing substrate nor with the anilox roller.

A computer program which computationally identifies the radially lowest point 56 in the printing area 50 and its radial distance 57 to the envelope 52, for instance by means of digital image processing, runs on the computer 39. This computation is made at regular intervals along the axial direction, for instance from DS to OS at all measuring points to find the respective maximum of the lowest points (i.e. the absolutely lowest value) from the DS to the center and from the center to the OS. The two maximums or the adjustment values computationally obtained therefrom may for instance be selected as the respective engagement/setting for DS and OS during the printing operation, i.e. the cylinder distance between the cylinders involved in the printing operation is reduced by the setting on DS and OS. A motor-driven threaded spindle may be used on DS and OS for this purpose.

The following is a tangible numerical example:

On one side, the resultant distance is deltaR=65 µm and on the other side the resultant distance is deltaR=55 µm. For all dots 53 to 55 on the printing plate to print, 65 µm needs to be set.

In all of the illustrated embodiments and the alternatives that have been given, the runout resulting from the manufacturing process and/or from the use of the sleeve 3 (due to wear) may be measured and may be factored in during the printing operation on the basis of the measurement and analysis results to improve the quality of the printed products. When a predefined runout tolerance is exceeded, an alarm may be output. The measurement may be taken on smooth and porous sleeves.

In accordance with the invention, radar emitters 19 (in combination with suitably adapted receivers) may be used instead of the light sources 19 or light emitters 19 (which emit visible light).

In all of the illustrated embodiments and the alternatives that have been given, parameters for a dynamic pressure adjustment may be determined and passed on to the printing press. In this process, a delayed expansion of the deformable and/or compressible print dots 53 to 55 made of a polymeric material may be known (for instance pre-measured) and made available to the computer 39 to be factored in. Or a hardness of the printing plate which has been pre-measured using a durometer may be used. The expansion may in particular be a function of the printing speed during operation, i.e. this dependency on the printing speed may be factored in. For instance at higher printing speeds, a higher printing pressure setting may be chosen.

What may likewise be factored in (as an alternative or in addition to the printing speed) is the printing surface of the printing plate 5 or the dot density, i.e. the density of the printing dots on the printing plate 5, which may vary from location to location. For instance, at higher dot densities, a higher printing pressure setting may be chosen and/or the dot density may be used to set up dynamic printing pressure adjustment.

The received light 25, i.e. essentially the emitted light 23 minus the light 24 shaded off by the topography 13, may be used to determine the local dot density. It carries information on the topography 13 to be measured and/or on the surface dot density and/or on the elevations thereof.

A device 43 for determining/measuring dot density, i.e. the local values thereof, on the printing forme, for instance a flexographic printing forme, may be provided, preferably in the form of a CIS scan bar or a line scan camera. For instance, on the basis of the data that has been obtained/calculated in the dot density determination process, specification values for different printing pressure settings on DS (drive side of the printing press) and OS (operator side of the printing press) may be provided.

If the dot density of the printing plate 5 and/or of an anilox roller 15 for ink application and/or of an anilox sleeve 15 is known, the expected ink consumption of the printing operation using the printing plate on a given printing substrate 11 may be determined by computation. The ink consumption may then be used to compute the required drying power of the dryers 10 to dry the ink on the printing substrate. The expected ink consumption has been calculated may also be used to calculate the amount of ink that needs to be provided.

In all of the illustrated embodiments and the alternatives that have been given, what is referred to as a cylinder bounce pattern may also be factored in. A cylinder bounce pattern is a disturbance that periodically occurs as the printing plate 5 rotates. It is caused by a page-wide or at least detrimentally wide gap or channel usually extending in an axial direction in the printed image, i.e. a detrimentally large area without printing dots, or any other type of axial gap. Such gaps or the cylinder bounce pattern they cause may affect the quality of the prints because due to the kissprint setting, the cylinders involved in the printing operation rhythmically get closer and separate again as the channel region returns during rotation. In an unfavorable case, this may result in undesired density fluctuation or in even print disruptions. An existing cylinder bounce pattern may preferably be detected by means of a CIS measuring device 43 (e.g. the aforementioned pivoting or movable mirror together with the area scan cameras) or by means of an area scan camera, computationally analyzed, and compensated for in the operationally required pressure setting. On the basis of the detected cylinder bounce pattern, for instance, the speeds or rotary frequencies at which vibration would occur in a printing press may be calculated in advance. These speeds or rotary frequencies will then be avoided during production and passed over in the process of starting up the machine.

Every printing plate 5 may have its own cylinder bounce pattern. Gaps in the printing forme may have a negative influence on the print results or may even cause print disruptions. To reduce or even eliminate the bouncing of cylinders, the printing plate is checked for gaps in the roll-off direction. If there are known resonance frequencies of the printing unit 9, production speeds that are particularly unfavorable for a given printing forme may be calculated. These printing speeds need to be avoided as "no go speeds".

In all of the illustrated embodiments and the alternatives that have been given, register marks (or multiple register marks such as wedges, double wedges, dots, or cross hairs) on the printing forme may be detected, for instance by means of the camera 21 or 43 and a downstream digital image processor, and their positions may be measured, saved, and made available. Thus, register controllers or the register sensors thereof may automatically be adapted to register marks or axial positions. Thus, errors which may otherwise be caused by manual adjustments of the sensors may advantageously be avoided. Alternatively, patterns may be detected and used to configure a register controller. It is also possible to automatically position a register sensor which is movable by a motor, in particular in an axial direction. It is also possible to compare a predefined zero point of the angular position of a printing cylinder and/or of a sleeve arranged thereon to an angular value of the actual location of a printed image (which has for example been glued on by hand), in particular in the circumferential direction (i.e. of the cylinder/sleeve). This comparison may be used to obtain an optimum starting value for the angular position of the cylinder/sleeve. In this way, register deviations may be reduced at the start of the production run. The same is true for the lateral direction (of the cylinder/sleeve).

In all of the illustrated embodiments and the alternatives that have been given, the power of the dryer 10 of the printing press 8 may likewise be controlled (potentially in a closed control loop). For instance, LED dryer segments may be switched off in areas in which no printing ink has been applied to the printing substrate, thus advantageously saving energy and prolonging the useful life of the LED.

In accordance with another advantageous feature, the power of the dryer 10 or of individual segments of the dryer may be reduced for areas on the printing plate which have a low dot density. This may save energy and/or prolong the useful life of a dryer or of individual segments. The stopping or reduction may occur in specific areas on the one hand and in a direction parallel to and/or transverse to the axial direction of a printing plate and to the lateral direction of the printing substrate to be processed by it. For instance, segments or modules of a dryer may be switched off in areas which correspond to gaps between printing plates (for instance printing plates which are spaced apart from one another, especially ones that have been glued on by hand).

In all of the illustrated embodiments and the alternatives that have been given, the respective location (on the printing plate 5) of measuring fields for print inspection systems may be detected and made available for further uses such as a location adjustment of the print inspection systems.

An inline color measuring system may be positioned in all of the illustrated embodiments and the alternatives that have been given. To determine the location and thus the position of the inline color measurement, an image and/or pattern recognition process is implemented to find the axial position for the measuring system. To provide a free space for calibration to the printing substrate, the inline color measurement system may be informed of unprinted areas.

The following section is an example of an entire process which may be carried out by a suitable embodiment of the device.

Measuring Process:

Step 1: Sleeve 3 with or without a printing plate 5 is slid onto the carrier cylinder 1 of the measuring station 2 on the air cushion and is then locked on the carrier cylinder 1.

Step 2: The sleeve is identified by a unique chain of signs 38, which may be a bar code, a 2D code (such as a QR code or a data matrix code), an RFID tag, or an NFC tag.

Step 3: Camera 21 and optionally the reference object 30 are positioned in accordance with the diameter (of the sleeve with or without the printing plate).

Step 4: The topography 13 of the printing plate, i.e. the radii of the elevations/print dots 53 to 55, is determined with the axis 6 or rather the axial center of the carrier cylinder 22 as the point of reference. In this process, the light source 19 and the camera 21 of the measuring device 18 may move in an axial direction and the carrier cylinder rotates (its angular position is known via an encoder).

Step 5: An area scan is made to detect dot densities, non-printing areas, printing areas, register marks, and/or measuring fields for inline color measurements.

Step 6: A topography algorithm running on a computer 39 is applied and the areas are analyzed via the area scan, including the detection of cylinder bounce patterns and the structure of register mark fields/inline color measurements.

Step 7: Optionally, the hardness of the plate is determined (in shore as the unit of measurement).

Step 8: A dust/hair detector is used.

Step 9: The data of the measured results are saved in a digital memory 40.

Step 10: The measured results are displayed, pointing out dust/hairs, air inclusions, and/or indicating thresholds for runout, eccentricity and/or convexity, for instance.

Step 11: The measurement may be retaken or the sleeve is removed to measure another sleeve.

Set-Up Process:

Step 1: Sleeve 3 with printing plate 5 is slid onto the printing cylinder 16 of the printing press 8 on the air cushion that has been created by applying air to the printing cylinder 16 and is then locked thereon.

Step 2: The sleeve and its unique chain of signs 38 is identified by the respecting printing unit 9, i.e. by a sensor provided therein. This may be done by bar code, 2D code (such as a QR code or data matrix), RFID tag, or NFC tag.

Step 3: The printing unit/printing press accesses the saved data associated with the identified sleeve/printing plate.

Adjustment Process:

Step 1: What is known as the kissprint setting (adjustment of the engagement/operating pressure) is set for the printing cylinder 16 and the screen cylinder 15, for instance based on the topography, runout, and printing substrate data, to achieve the optimum print setting. The diameter/radius are determined. The diameter/radius are known from the measurement.

Step 2: The pre-register is calculated on the basis of the register mark data on the printing plate or of a point of reference on the sleeve.

Step 3: The dynamic printing engagement is set in accordance with the determined dot density values, the printed area, the printing speed, and optionally of the printing substrate. Optionally, the hardness of the plate is factored in (in Shore as the unit of measurement).

Step 3: The optimum speed for the web of material is set, for instance on the basis of the calculation of the determined resonance frequencies of the printing unit for the printing plate by detecting the cylinder bounce pattern.

Step 5: The optimum drying power (UV or hot air) is set on the basis of the dot density values and the printed area as well as on the basis of anilox cylinder data (such as pick-up volume), and is optionally dynamically adapted to the speed of the web of material.

Step 6: The ink consumption is calculated on the basis of the dot density values and the printed area as well as on the basis of anilox cylinder data (such as pick-up volume).

Step 7: LED-UV dryer sections in places where the plate has a low dot density or where no drying is needed are reduced or switched off to save energy and increase the useful life of the LEDs.

Step 8: The register controller is set in a fully automated way on the basis of the obtained register mark data, for instance the mark configuration and the automated positioning of the register sensor.

Step 9: The measuring position for spectral inline measurement and print inspection of the printed inks is set, information on the location/the measuring position is provided.

Figure 6:
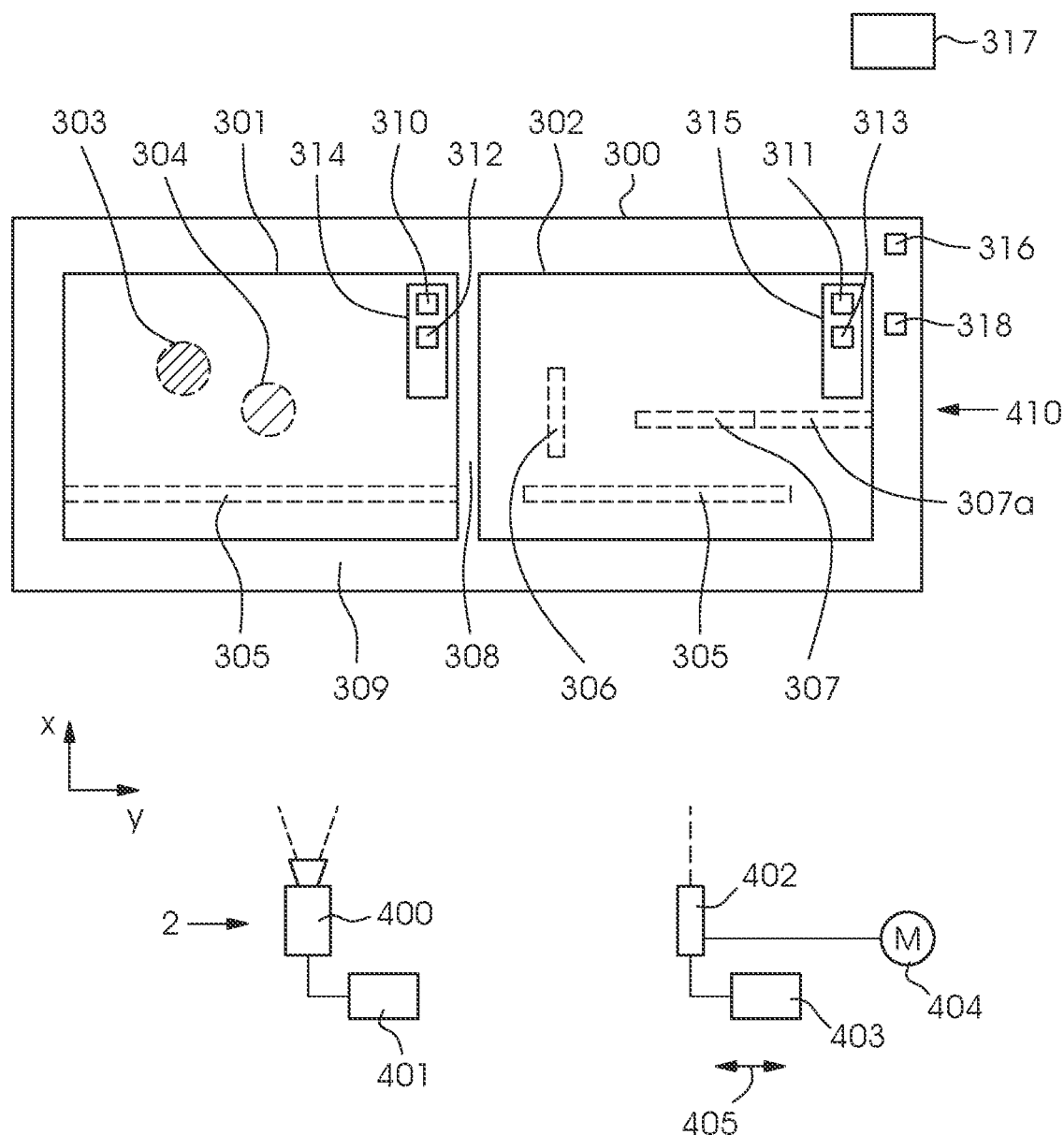
FIG. 6 is an illustration showing a recorded image on a sleeve carrying two flexographic printing formes by way of example.

FIG. 6 illustrates a recorded image 410 of a sleeve 300 and of two flexographic printing formes 301 and 302 shown as an example. The image has preferably been recorded/generated by a camera 400, in particular in a measuring station 2. The image may be transmitted to a computer 401. This computer may be the computer 39 shown in FIG. 2A. The image may be subjected to computational image processing to obtain information/data. These data may be saved in a digital memory 317 in association with an ID/an identifier 316 on the sleeve and may be made available to the flexographic printing press when the sleeve is used and the ID is called up.

The figure illustrates an example of a recorded area 303 of a high dot density and a recorded area 304 of a low dot density. The areas may be detected and separated by an image processing system and may preferably be color-coded. The knowledge of the local dot densities of the entire flexographic printing forme 301 (and of the further flexographic printing forme 302) may be used to computationally determine a presetting for what is referred to as the printing engagement, i.e. a setting of the contact pressure between the flexographic printing cylinder and the impression cylinder (and/or the anilox roller) when the sleeve is in use.

The figure also shows an example of a detected gap 305. In the region of the gap 305, there are no (or essentially no) printing elevations on the flexographic printing forme 301, i.e. in this region, the dot density value equals zero. The gap 305 primarily extends in an axial y direction and has an axial length in this direction y (and a width in a direction x) that makes it critical in terms of potential cylinder bouncing when the gap passes the printing nip and thus in terms of potentially detrimental vibration (causing undesired waste) when the flexographic printing press is in operation. Critical vibrations are the ones in the range of resonance frequencies. Gaps 306 and 307 are two examples of gaps that are uncritical from this point of view because of their dimensions and because they are adjacent to printing areas 307a. The same is true for the gap 308 formed between the two flexographic printing formes 301 and 302 which are mounted at a distance from one another (e.g. glued to the sleeve 300). The gap 309 between the leading and trailing edges of the flexographic printing forme 301 however may be critical. A mounted printing forme may only assume 60% of the circumference of the sleeve 300, for example, i.e. 40% of the circumference correspond to the gap 309. Critical gaps are computationally detected and preferably identified as such.

FIG. 6 also shows two examples 310 and 311 of register marks as well as color measurement fields 312 and 313. In the illustrated example the marks and fields are disposed in control strips 314, 315, respectively. The marks and fields are preferably likewise recorded by the camera 400, recognized by an image processing system, and separated. Their positional data (x-y localization) are saved in association with the ID 316 of the sleeve.

FIG. 6 further shows an example of what is referred to as an error mark 318 for detecting a faulty mounting of a flexographic printing forme or of multiple flexographic printing formes on the sleeve or on multiple sleeves. Their positional data are likewise saved in association with the ID 316 of the sleeve.

FIG. 6 further illustrates a sensor 402. The sensor 402 may be a register sensor and/or a spectrometer, which is/are in particular disposed in the flexographic printing unit of the flexographic printing press and directed towards the web of printing substrate 11. The sensor is connected to a computer 403 and may be moved in an axial direction y 405 by means of a motor 404 and may thus be positioned in an automated way. Using the data generated from the image 410 and making them available to the printing press when the sleeve 300 is being used, the sensor may be positioned along the printing substrate 11 to the y position of a mark 310, 311 to be printed and recorded and/or the same sensor or a further sensor may be positioned along the printing substrate 11 in field 312, 313 for instance for color inspection by means of a spectrometer. The data generated by the sensor are then forwarded to the computer 403, which may be the same as computer 401 and/or as computer 39.

The following is a summary list of reference numerals and the corresponding structure used in the above description of the invention:

1 carrier cylinder
2 measuring station
3 sleeve
3a ID of the sleeve
4 adhesive tape
5 printing plate/flexographic printing forme flexographic printing forme
5a ID of the printing plate/flexographic printing forme
6 rotary body/flexographic printing forme
7 first motor
8 printing machine/flexographic printing press
9 printing unit/flexographic printing unit
10 dryer
11 printing substrate
12 measuring rings
13 elevations/topography
14 surface
15 anilox roller/anilox cylinder
15a ID of the anilox roller/anilox cylinder
16 printing cylinder
17 impression cylinder/printing substrate transport cylinder
18 measuring device
19 radiation sources, in particular light sources
20 reflector/mirror
21 radiation receiver, in particular optical receiver such as cameras
22 axis of rotation
23 light curtain/emitted light
24 shading
25 reflected light 26 operating width
27 axial direction
28 direction of movement
29 second motor
29b further second motor
30 reference object/line-like object, in particular thread/string/blade/bar
31 line of reference
32 distance
33 circumferential surface
34 unit
35 circumferential direction
36 shading
37 sensor
38 identification mark/ID
39 digital computer
39b further digital computer
40 digital memory
41 drive side (DS)
42 operator side (OS)
43 device for determining dot density
44 laser micrometer
45 third motor
46 measuring row
47 measuring strip
48 multiple measuring rows
50 printing area
51 non-printing area
52 enveloping radius/envelope
53 print dot on the printing plate
54 dot just barely printing on the printing plate
55 non-printing dot on the printing plate
56 lowest point
57 radial distance
58 marking means
59 measuring field for measuring shore hardness
60 motor
62 device for scanning the ID
300 sleeve
301 flexographic printing forme
302 further flexographic printing forme
303 area of high dot density
304 area of low dot density
305 gap
306 gap, non-printing area
307 gap, non-printing area
307a printing area
308 gap between flexographic printing formes
309 gap
310 register mark
311 register mark
312 color measuring field
313 color measuring field
314 control strip
315 control strip
316 ID
317 memory
318 error mark
400 camera
401 computer
402 sensor
403 computer
404 motor
405 direction of movement
410 image
R radial distance
D diameter
x direction (circumferential direction)
y direction (axial direction)

The invention claimed is:

1. A method of operating a flexographic printing press, the flexographic printing press containing a printing cylinder carrying a sleeve with at least one flexographic printing forme or a flexographic printing cylinder, and an impression cylinder forming a printing nip with the printing cylinder to print on a web of printing substrate, the method comprises the step of:
   automatically adjusting a transport speed of the web of printing substrate in dependence on a dot density measured on the flexographic printing forme, namely of a location-dependent density of printing elevations on the flexographic printing forme, or of data computationally derived from the dot density measured on the flexographic printing forme, or in dependence on gaps measured on the flexographic printing forme or the printing cylinder or data computationally derived from the gaps measured on the flexographic printing forme or the printing cylinder.

2. The method according to claim 1, wherein the dot density of the flexographic printing forme or the gaps is/are measured in a contact-free way.

3. The method according to claim 1, wherein the dot density of the flexographic printing forme or the gaps are measured in a measuring device before a printing operation.

4. The method according to claim 3, wherein a camera is used in a measuring process.

5. The method according to claim 4, wherein an entire image of the flexographic printing forme or of the printing cylinder is recorded in the measuring process.

6. The method according to claim 5, wherein the flexographic printing forme or at least two flexographic printing formes is/are mounted to the sleeve and recorded in the measuring process.

7. The method according to claim 1, wherein the dot density is computationally determined from prepress data for creating the flexographic printing forme.

8. The method according to claim 1, wherein a calculation of adjustment values is made.

9. The method according to claim 8, which further comprises transmitting the adjustment values to a control unit of a motor for rotating the printing cylinder and/or the impression cylinder and/or an anilox roller and/or to a control unit of a motor for conveying the web of printing substrate.

10. The method according to claim 8, wherein the calculation is made in dependence on the dot density of the flexographic printing forme, namely of the location-dependent density of the printing elevations of the flexographic printing forme, or of the data computer computationally derived therefrom, or as a function of the gaps of the flexographic printing forme or of the printing cylinder or of the data derived therefrom.

11. The method according to claim 8, wherein the calculation includes calculating various cylinder bounce frequencies at various surface speeds.

12. The method according to claim 8, wherein the calculation includes a use of or an exclusion of measured and/or predefined resonance frequencies of the printing cylinder and/or of the impression cylinder and/or of components of the flexographic printing press and/or of printing units of the flexographic printing press and/or of a flexographic printing unit.

13. The method according to claim 1, wherein rotary speeds of the printing cylinder which generate undesired resonance vibration detrimental to a quality of prints and due to at least one cylinder bounce or due to a cylinder bounce pattern caused by a gap or by multiple gaps are avoided during an operation of the flexographic printing forme with at least one pre-measured flexographic printing forme or are skipped when a rotary speed is changed.

14. The method according to claim 1, wherein the flexographic printing press contains an anilox roller for inking the flexographic printing forme.

15. A flexographic printing press, comprising:
at least one flexographic printing unit having a printing cylinder carrying a sleeve with at least one flexographic printing forme or a flexographic printing cylinder, an impression cylinder forming a printing nip with said printing cylinder, and an anilox roller;
a motor for conveying a web of printing substrate;
at least one further drive motor for rotatively driving said printing cylinder and/or said impression cylinder and/or said anilox roller and/or for rotatively driving said motor for conveying the web of printing substrate; and
the flexographic printing press operated to print on the web of printing substrate, the flexographic printing press configured to automatically adjust a transport speed of the web of printing substrate in dependence on a dot density measured on said flexographic printing forme, namely of a location-dependent density of printing elevations on the flexographic printing forme, or of data computationally derived from said dot density measured on said flexographic printing forme, or in dependence on gaps measured on the flexographic printing forme or the printing cylinder or data computationally derived from said gaps measured on the flexographic printing forme or the printing cylinder.

16. The flexographic printing press according to claim 15, wherein said at least one further drive motor is computationally controlled using the dot density or the data derived therefrom or in dependence on said gaps of said flexographic printing forme or of said printing cylinder or the data computationally derived therefrom in such a way that the transport speed of the web has a predefined value or a predefined value range or that the transport speed of the web excludes a predefined value or a predefined range of values.

17. The flexographic printing press according to claim 15, wherein said sleeve carries at least two flexographic printing formes with a same or different images to be printed.

18. The flexographic printing press according to claim 17, wherein said two flexographic printing formes are mounted to said sleeve so as to follow one another in a circumferential direction or so as to follow one another in an axial direction.

19. The flexographic printing press according to claim 17, wherein said at least one flexographic printing forme has at least one gap and/or a gap is formed between said flexographic printing formes.

20. A system, comprising:
said flexographic printing press according to claim 15; and
a measuring device for measuring the dot density of said flexographic printing forme, said measuring device measuring the dot density on said flexographic printing forme or measuring said gaps on said flexographic printing forme or said printing cylinder and transmitting the dot density or data computationally derived from the dot density measured on said flexographic printing forme or said gaps or data computationally derived from said gaps measured on said flexographic printing forme or said printing cylinder to said flexographic printing press.

21. The system according to claim 20, wherein said flexographic printing forme and/or said sleeve is marked with a machine-readable ID.

22. The system according to claim 21, wherein the machine-readable ID is an unambiguous identifier of said sleeve.

23. The system according to claim 21, wherein said measuring device indirectly transmits the dot density or the data derived therefrom or the gaps of said flexographic printing press or of said printing cylinder to said flexographic printing press together with the machine-readable ID in that the dot density or the data derived therefrom is buffered and accessed by said flexographic printing press for a printing operation using said flexographic printing forme and/or said sleeve.

24. The system according to claim 23, wherein the data derived include at least one bounce pattern or a frequency corresponding to the at least one bounce pattern.

* * * * *